(No Model.) 2 Sheets—Sheet 1.
J. C. JONES.
Stock Car.
No. 243,572. Patented June 28, 1881.
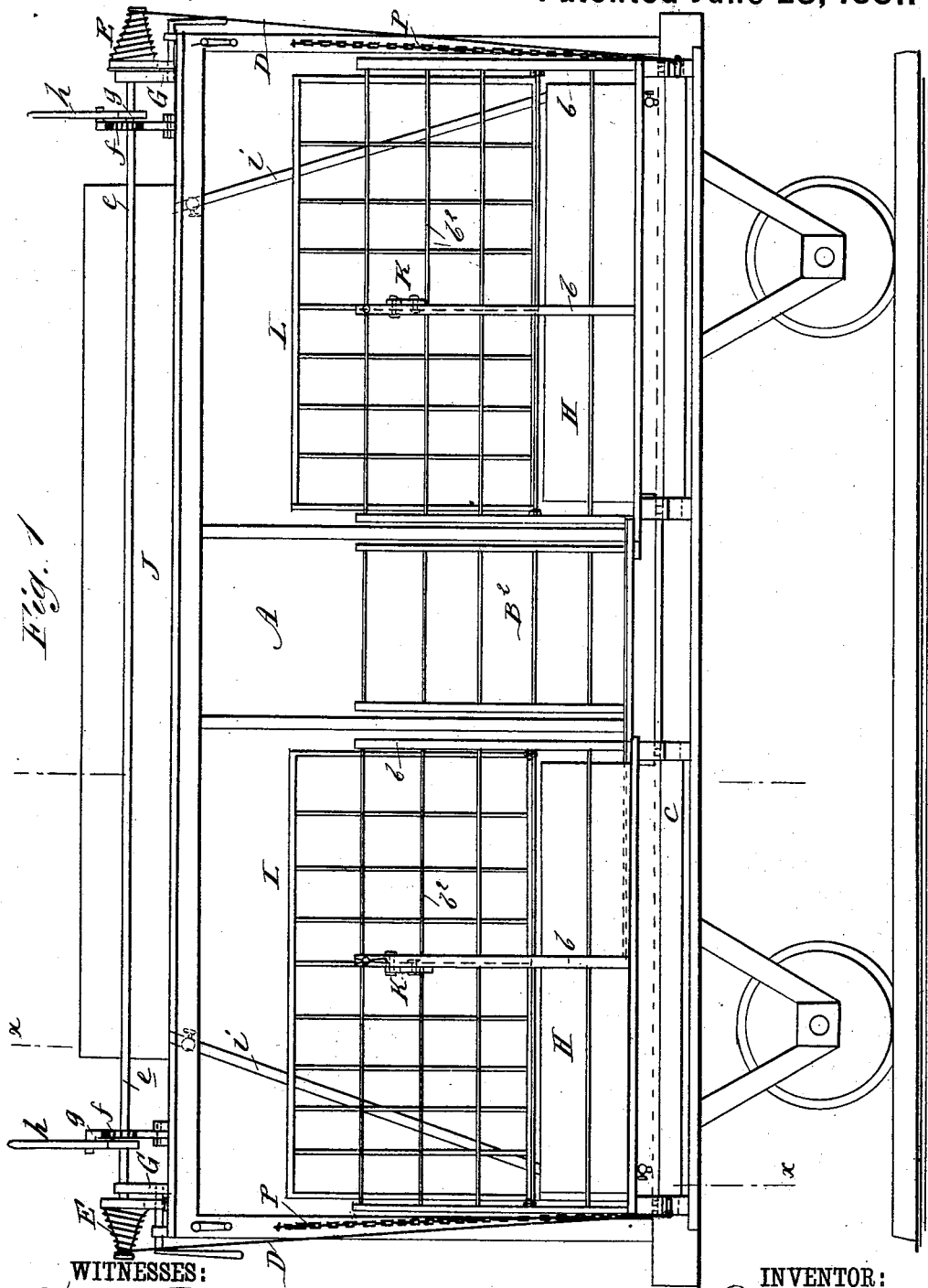
WITNESSES:
C. Neveux
C. Sedgwick
INVENTOR:
J. C. Jones
BY Munn & Co.
ATTORNEYS.

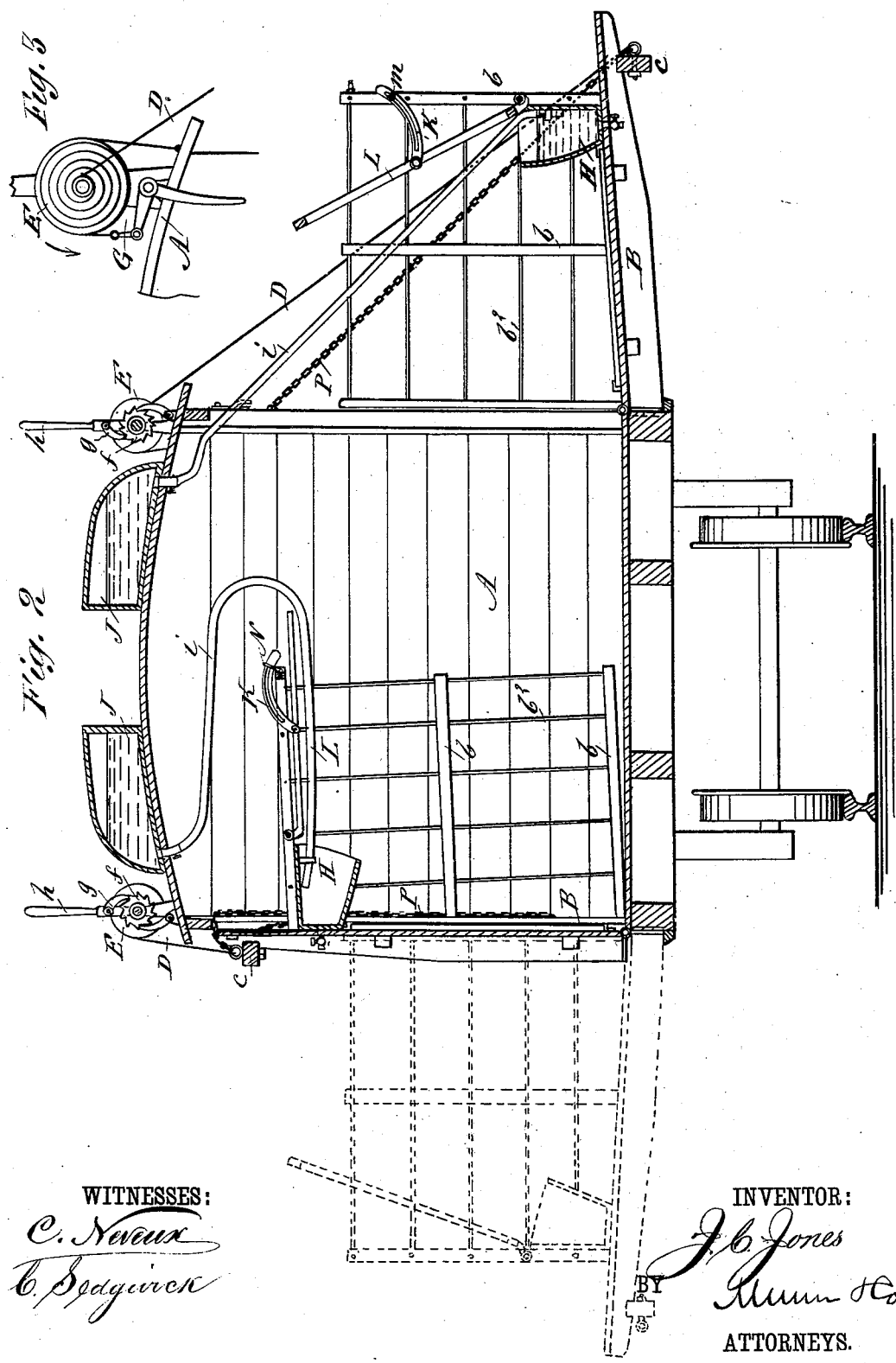

UNITED STATES PATENT OFFICE.

JEREMIAH C. JONES, OF WHITT, ASSIGNOR OF ONE-FOURTH TO ALEXANDER W. ROBERTSON, OF DENTON COUNTY, TEXAS.

STOCK-CAR.

SPECIFICATION forming part of Letters Patent No. 243,572, dated June 28, 1881.

Application filed March 22, 1881. (No model.)

*To all whom it may concern:*

Be it known that I, JEREMIAH C. JONES, of Whitt, in the county of Parker and State of Texas, have invented a new and useful Improvement in Stock-Cars, of which the following is a full, clear, and exact description.

This invention relates to a car for transporting cattle and horses on railways; and the object of the invention is to provide means for allowing the animals occasional opportunities to lie down and rest and be fed and watered.

The invention consists, essentially, in a novel construction of the body of the car and the side walls thereof, and in certain details of construction and arrangement of devices employed in connection therewith, whereby provision is made for lowering said side walls so as to form lateral extension of the floor, and for supplying the animals with food and water.
In the accompanying drawings, Figure 1 is a side view of a car embodying my improvements. Fig. 2 is a transverse vertical section of the same. Fig. 3 is a detail view.

Similar letters of reference indicate corresponding parts.

The general construction of the body of the car A may be of the usual or any suitable description.

The side walls, B, are hinged to the side edges of the floor of the car, so that they may be lowered to a position nearly or quite on a level with said floor. At the ends and outer sides or edges of the side walls are posts $b$, to which iron rods $b^2$ are secured, so as to form a fence or railing when said sides are lowered, and the outer edge of each side wall is strengthened by a brace, $c$.

To the outer corner of each end of the side wall is attached one end of a chain or rope, D, the other end of which is attached to a conical drum or windlass, E, at or near the top of the end of the car. The windlass is provided with a ratchet, $f$, and pawl $g$ for turning it, said ratchet being attached to the shaft $e$, which carries the drum, and said pawl being provided with a lever-handle, $h$. The windlass is also provided with a brake, G, for regulating its motion when the side wall is being lowered, said brake consisting of a spring with one end attached to the roof of the car and the other end connected to an elbow-lever.

When the side walls are closed up they are secured by hasps and staples fastened by pins or padlocks, and the railings fit snugly against the ends and under the top of the car, as shown in Fig. 2. When the side walls are lowered they are held by chains P, and form pens or extensions of the car, and give the animals more space in which to move about or to lie down and rest, and also provide for supplying them with food and water. Each pen thus constructed is provided with one or more troughs, H, which are supplied with water through hose $i$ from reservoirs or tanks J at the top of the car, and are provided with valves for letting off the unused water.

To the side walls are attached adjustable feed-racks, each of which consists of a grating, L, having its lower edge pivoted to the wall and provided about midway of its width with a slotted curved bar, K, which engages with a pin or stud, $m$, on one of the posts $b$, so that the grating may be lowered for the reception of fodder, as shown at the right-hand side of Fig. 2, or folded flat against the railing when not in use, as shown at the left-hand side of said figure. When so folded or closed it is held in place by the engagement of a spring-catch, $n$, with serrations on the edge of the bar K.

Having thus described my invention, I claim as new and desire to secure by Letters Patent—

1. A stock-car having hinged side walls provided with railings or fences, so as to form pens for animals when said side walls are lowered, substantially as and for the purpose herein described.

2. The combination, with the car A and the hinged side wall, B, provided with the brace $c$, of the supporting-chains P, substantially as and for the purpose herein described.

3. The combination, with the car A and adjustable side wall, B, of the trough H, hose $i$, and water tank or reservoir J, arranged as herein shown and described.

4. The combination, with the car A and adjustable side wall, B, of the rope or chain D and conical drum or windlass E, operated by the ratchet $f$, pawl $g$, and lever-handle $h$, as herein shown and described.

5. In a stock-car, the combination, with a windlass, of a side wall, B, hinged to the side edges of the floor, and provided at the outer corner of each end with a chain or rope, D, as and for the purpose specified.

6. The combination, with the hinged side walls, B, of the gratings L, pivoted thereto at the lower end, having at the middle a slotted curved bar, K, and engaging with studs on the posts $b$, as and for the purpose specified.

JEREMIAH C. JONES.

Witnesses:
WILLIAM C. PRATT,
WILLIAM C. THOMPSON.